United States Patent [19]
Miller

[11] 3,797,660
[45] Mar. 19, 1974

[54] ION EXCHANGE RESIN SEPARATION APPARATUS AND METHOD EMPLOYING SONIC MEANS TO SENSE RESIN LEVEL

[75] Inventor: Cole R. Miller, Medford Lakes, N.J.

[73] Assignee: Ecodyne Corporation, Chicago, Ill.

[22] Filed: June 23, 1972

[21] Appl. No.: 265,924

Related U.S. Application Data

[63] Continuation of Ser. No. 878,784, Nov. 21, 1969, abandoned.

[52] U.S. Cl. .............................. 209/499, 209/160
[51] Int. Cl. .............................................. B03b 11/00
[58] Field of Search ........ 210/24, 30, 104; 340/244; 73/290; 209/158-161, 499

[56] References Cited
UNITED STATES PATENTS

| | | | |
|---|---|---|---|
| 3,595,385 | 7/1971 | Duff | 209/1 |
| 2,960,678 | 11/1960 | Beard et al. | 73/290 UX |
| 3,246,516 | 4/1966 | Maropis | 73/290 U |
| 3,512,640 | 5/1970 | Hellmann | 210/189 X |
| 3,213,438 | 10/1965 | Felice et al. | 340/244 |
| 2,767,140 | 10/1956 | Fitch | 210/33 |
| 2,952,621 | 9/1960 | McClure | 214/17.62 UX |
| 2,990,543 | 6/1961 | Rod | 340/244 |
| 3,110,890 | 11/1963 | Westcott et al. | 340/244 |
| 3,184,969 | 5/1965 | Bolton | 73/290 U |

*Primary Examiner*—Frank W. Lutter
*Assistant Examiner*—Ralph J. Hill

[57] ABSTRACT

A separation column and method for separating anion and cation exchange resins in an upwardly flowing stream of water employing ultrasonic level sensing means. The sensing means include first and second transducer means for respectively sensing and receiving an ultrasonic signal in the frequency range of 1 to 5 megacycles per second. In one embodiment of the invention, the level of resin within the column is sensed when the resin interrupts transmission of the ultrasonic signal at a probe. In a second embodiment, the ultrasonic signal is directed toward the surface of the resin, and the time delay for receipt of an echo is measured. This time delay, in turn, gives an indication of the level of ion exchange resin within the column.

5 Claims, 3 Drawing Figures

Inventor.
Cole R. Miller.
By Hume, Clement, Hume, & Lee.
Attys.

Inventor.
Cole R. Miller.
By Hume, Clement, Hume & Lee.
Attys.

ION EXCHANGE RESIN SEPARATION APPARATUS AND METHOD EMPLOYING SONIC MEANS TO SENSE RESIN LEVEL

This is a continuation of application Ser. No. 878,784, filed Nov. 21, 1969, now abandoned entitled ION EXCHANGE RESIN SEPARATION APPARATUS AND METHOD EMPLOYING SONIC MEANS TO SENSE RESIN LEVEL. The present invention relates to improved apparatus for controlling the level of solid ion exchange resin in a separation column.

A commercially important and highly successful method for demineralizing water is a mixed-bed ion exchange system, which employs one or more service columns filled with a mixture of anion and cation exchange resins. The cation exchange resin is generally in the hydrogen form, although it may also be partially or completely in the ammonium form, while the anion exchange resin is in the hydroxide form. This process employs a service column that is normally maintained under pressure, and which delivers raw water to the resin in an upflow direction. The pressure within the column forces exhausted resin out at the bottom during the service cycle. Periodically, the service column is depressurized, and regenerated resins are introduced at the top.

In order to regenerate the ion exchange resins it is necessary that they first be separated. This separation step is carried out in a separation tank or column to which the resin is delivered from the service column. Because the anion exchange resin is less dense than the cation exchange resin, the resins may be separated by an upflow of water in the separation column, which carries the lighter anion exchange resin to an upper portion of the column, while allowing the cation exchange resin to sink to the bottom. These separated resins are removed from the separation column and transferred to regeneration columns for regeneration and rinsing. Subsequent to regeneration, the resins are mixed and transferred back to the service column.

Delivery of resin to the separation column is controlled by opening and closing a valve on the resin conduit leading from the service column to the separation column. In a "C.I." type of system, no pump is required on this line, since the pressure in the service column during the service cycle forces resin through the conduit. However, in other types of systems, a pump may be required. The delivery of resin to the separation column is controlled in accordance with the resin level within the column. When the resin rises to a predetermined level, the delivery of resin to the separation column is halted for a given period of time, after which exhausted resin is again delivered to the separation column until it again rises to the aforementioned predetermined level.

A difficulty arises in sensing the level of ion exchange resin within the separation column. Conventionally, photoelectric cells have been used to perform this sensing function. While photocells are adequate to sense the presence of bead resin, which is generally in the size range of about 20 to 60 mesh, and to distinguish this bead resin from water, a difficulty arises because the upflow of water within the separation column carries fines upwardly, producing a layer of fines above the bead resin. These fines comprise mainly finely divided resin that is produced by mechanical abrasion of the resin beads during handling. The fines also include small particles of solids removed from the water during the service cycle. When a photocell is employed to sense the level of resin in the separation column, these fines can "fool" the cell by interrupting the light beam, which will prematurely halt delivery of resin to the separation column. Since the separation column therefore will not contain the proper level of resin, its efficiency of operation will be impaired.

Even without the problem of fines, the use of photocells presents additional difficulties. A primary difficulty with photocells is their tendency to become dirty and corroded during use, so that the unit must be shut down in order to have them cleaned. In addition, the general unreliability of the photocells requires the presence of more than one cell within the separation column to act as emergency shut-off means in the event that the primary photocell ceases to properly perform its function.

Generally, the present invention relates to improved apparatus for controlling the level of solid ion exchange resin in a separation tank that is completely filled with water and ion exchange resin, the improved apparatus eliminating the use of photocells. As is conventional, the improved apparatus includes mixed resin inlet means which communicate with the separation column. Valve means are located on the mixed resin inlet means, and control means are operatively connected to the valve means. Sonic level sensor means communicate with the interior of the column. The sonic level sensor means include first and second transducer means, the first transducer means being adapted for generating an ultrasonic signal having a frequency in the range of one to five megacycles per second, and the second transducer means being adapted for receiving the ultrasonic signal. The transducer means are operatively connected to the control means to open and close the valve on the mixed resin inlet means responsive to the level of resin in the separation column as determined by the ultrasonic signal.

The invention will be best understood by reference to the following detailed description, taken together with the drawings, in which.

Figure 1:
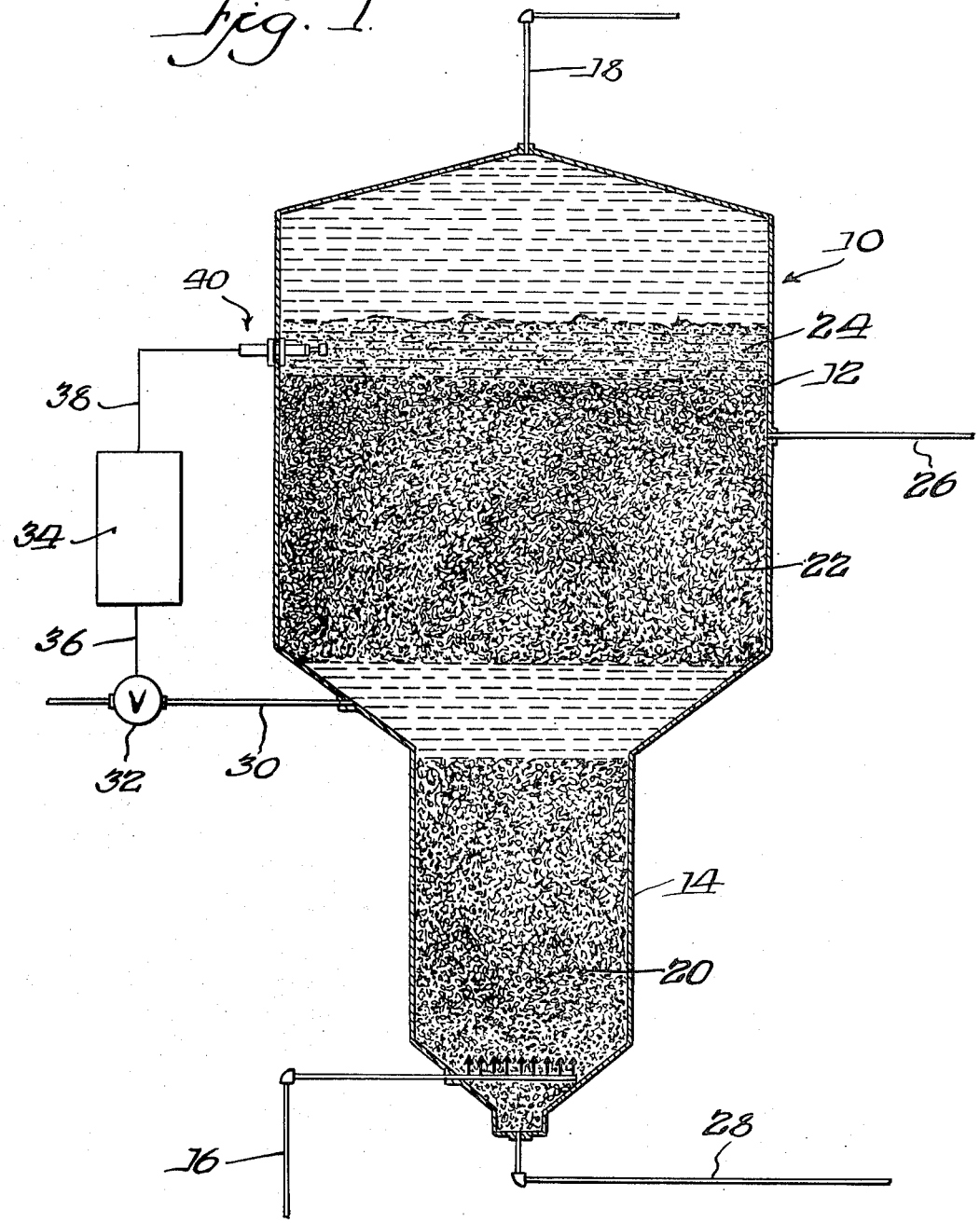
FIG. 1 is a diagrammatic elevation view of an ion exchange resin separation column embodying the present invention.
Figure 2:
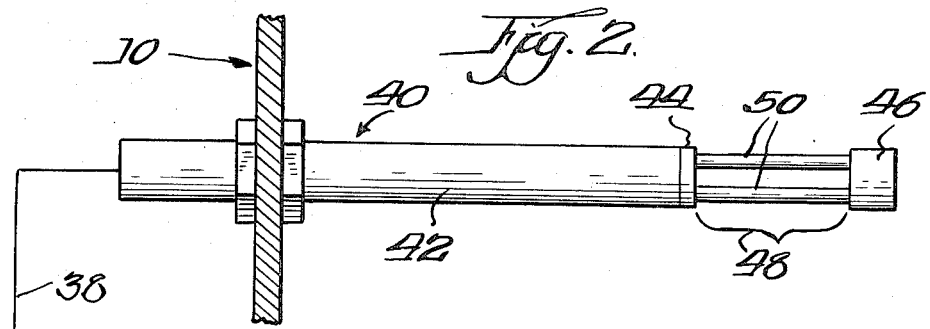
FIG. 2 is a fragmentary view of the apparatus shown in FIG. 1, illustrating the details of the sonic probe.

The first embodiment of the present invention, as shown in FIGS. 1 and 2, is one in which the aforementioned sonic sensor means comprise a probe positioned within the separation column at the desired level of the bead resin. The probe has a gap that is sufficiently large to allow it to be filled with ion exchange resin beads in the size range of about 20 to 60 mesh, whereby to interrupt the signal between the aforementioned first and second transducer means.

Figure 3:
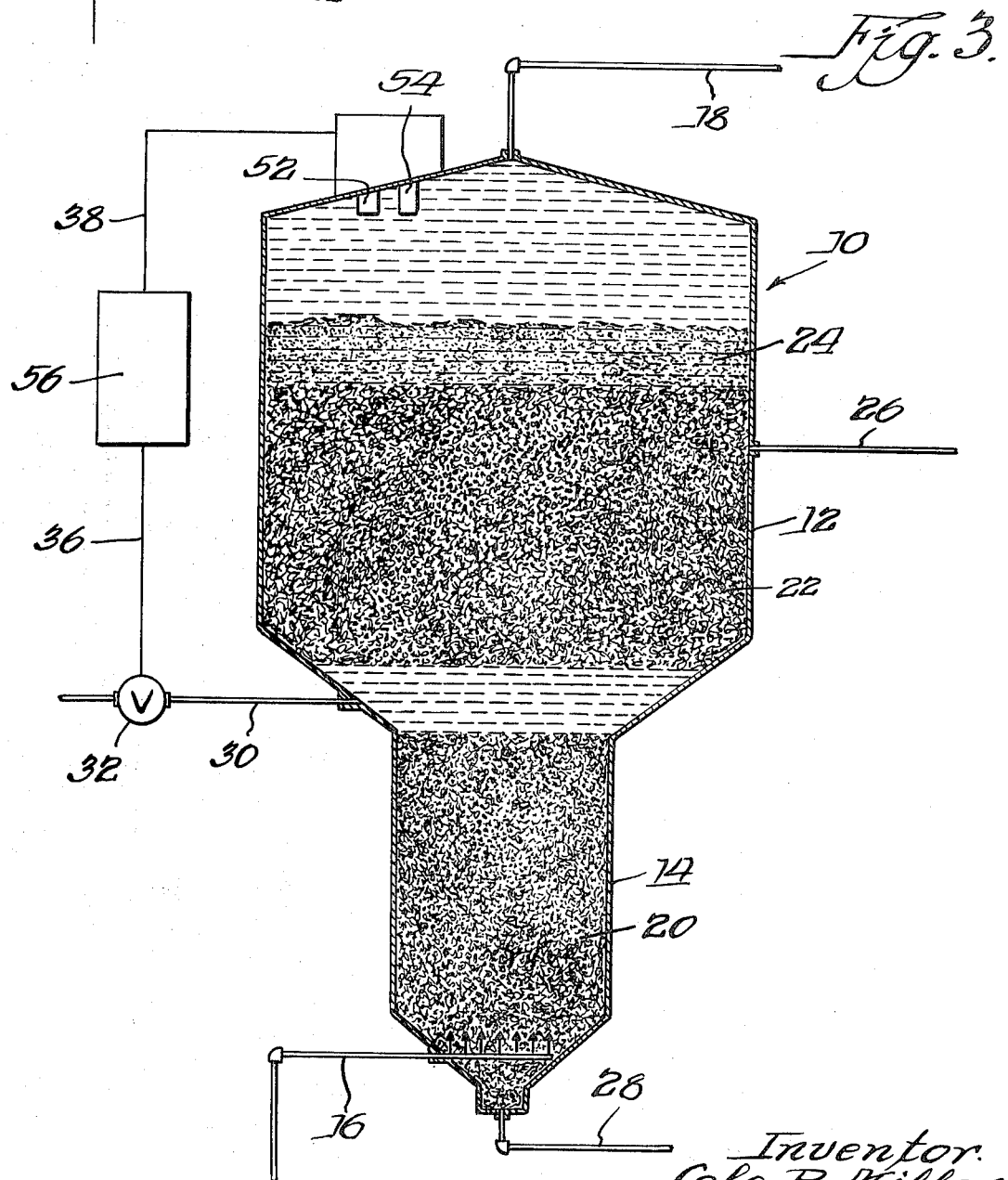
FIG. 3 is a diagrammatic elevation view of an apparatus illustrating a second embodiment of the present invention.

In the second embodiment, as shown in FIG. 3, the first and second transducer means are located at the top of the column, and the first transducer means include means for emitting downwardly directed ultrasonic pulses, while the second transducer means are positioned to receive echoes from these pulses reflected off the surface of the bead resin in the tank. Time sensing means are provided for sensing the time delay between the delivery of a pulse at the first transducer means and the receipt of an echo at the second transducer means. The time delay will indicate the level of resin within the tank, the longer the delay the lower the resin level. The control means include means for controlling the valve on the mixed resin inlet means responsive to changes in this time delay.

Referring to the drawings, and more specifically to FIG. 1, there is illustrated one embodiment of the present invention. Basically, the apparatus comprises a separation column, indicated generally by reference numeral 10, having a relatively larger diameter upper portion 12 and a relatively smaller diameter lower portion 14. While it is not essential to employ a separation column 10 having such a shape, the larger upper portion 12 of the column 10 produces a smaller upflow rate of water in this portion, and thus leads to more efficient separation of the resin.

Water is introduced into the column 10 through a water inlet pipe 16 communicating with a lower portion thereof. This water is withdrawn from the column 10 at a water outlet pipe 18 communicating with an upper portion thereof. As shown on the drawing, this upflow of water separates the resin into the more dense cation exchange resin 20, occupying the lower portion 14 of the column 10, and the less dense anion exchange resin 22, occupying the upper portion 12. Because of the upflow of water from the water inlet pipe 16 to the water outlet pipe 18, a layer of fines 24 is produced at the top of the resins above the layer of anion resin beads 22.

Separated anion exchange resin is removed from an upper portion of the column 10 through an anion resin outlet conduit 26, while cation exchange resin is removed from the bottom of the column through a cation resin outlet conduit 28. Both the anion and cation resin outlet conduits 26, 28, respectively, lead to suitable regeneration columns (not shown) for each of these resins.

Exhausted resin from the service column (not shown) is delivered to the separation column 10 through a mixed resin inlet conduit 30, preferably communicating with a central portion of the separation column 10. The mixed resin inlet conduit 30 has a valve 32 which is connected to control means 34 by a suitable control conduit 36, which may be pneumatic, electrical, mechanical, hydraulic, etc. The control means 34 is, in turn, connected by a control conduit 38, which preferably is an electrical conduit, to the sonic probe, which is generally indicated by reference numeral 40. The sonic probe is preferably, but not essentially, positioned at the desired maximum level of bead resin within the separation column 10.

Referring to FIG. 2, the sonic probe 40 is of elongated configuration, and positioned horizontally within the separation column 10. The sonic probe 40 comprises a main body portion 42, which is annular in shape, and which penetrates the side wall of the separation column 10. A first transducer means 44, for generating an ultrasonic signal in the range of 1 to 5 megacycles per second is positioned at the end of the main body portion 42. This transducer means may be of any conventional design, as is well known to those skilled in the art, such as a piezoelectric crystal. Second transducer means 46 are spaced from the first transducer means 44 by a gap 48, the second transducer means 46 being held in spaced relationship with the first transducer means 44 by suitable spacer members 50. These spacer members 50 are also capable of carrying an electrical signal.

The width of the gap 48 is not critical, except that it must be sufficiently wide to permit exchange resins beads in the size range of 20 to 60 mesh to enter the gap 48, and also must be sufficiently wide to prevent these resins from becoming jammed within the gap 48. On the other hand, the gap 48 should not be excessively wide, as an excessively wide gap 48 would require very high signal strength generated at the first transducer means 44 in order to operate the device. Generally, a gap 48 in the range of about 1 to 2 inches, and preferably about 1.5 inches, is preferred.

In operation, referring to FIGS. 1 and 2, resin is delivered to the separation column 10 by opening the valve 32 on the mixed resin inlet conduit 30. While resins are being delivered, water is delivered at a carefully controlled rate in an upflow direction through the column, being introduced at the water inlet pipe 16 and removed at the water outlet pipe 18. By properly controlling the flow rate of this water, the resin is separated into a lower layer of cation exchange resin 20 and an upper layer of anion exchange resin 22. At the same time, a layer of fines 24 will normally be produced above the anion exchange resin 22. While these fines 24 enter the gap 48 between the first and second transducer means 44, 46, respectively, these fines do not sufficiently interrupt the ultrasonic signal to indicate that the valve 32 should be closed. As the level of resin within the column 10 continues to rise, the bead resin 22 eventually penetrates the gap 48 in the sonic probe 40. This interrupts the signal between the first and second transducer means 44, 46.

The fact that no signal is being received by the second transducer means 46 is transmitted to the control means 34 through the control conduit 38. Because no signal is sent, the control means 34 will automatically deliver a signal to the valve 32 through the control conduit 36, closing the valve 32, and halting the delivery of mixed resin to the column. Also at this time, a timer is started within the control means 34, which is set to run for a predetermined interval. This interval should be long enough to allow the resin in the column to fall below the level of the sonic probe 40.

After this predetermined interval has expired, the sonic probe 40 is again operated in order to determine whether or not there is any resin at the level of the sonic probe 40. Assuming that a signal passes between the first and second transducer means 44, 46, the control means 34 will sense that there is no resin at the level of the probe 40, and will open the valve 32. The valve 32 will remain open until the ultrasonic signal delivered from the first transducer means 44 to the second transducer means 46 is again interrupted.

In order to be sure that the ultrasonic probe 40 is not "fooled" by the fines 24, it is necessary initially to adjust or "tune" the probe 40. This is accomplished by simply adjusting the amount of gain on the first transducer means 44 to produce an ultrasonic signal of sufficient strength that it is not interrupted by resin fines, but of insufficient strength to be passed through the bead resin.

As previously mentioned, the first transducer means should have an ultrasonic output in the range of about 1 to 5 megacycles. Best results are obtained in the preferred frequency range of about 2.6 to 3.0 megacycles per second.

FIG. 3 shows a second embodiment of the present invention. The separation column 10 and its basic operation are the same as for the embodiment shown in FIG. 1, and like parts are designated by like reference numerals. In the second embodiment, the first transducer means 52 and the second transducer means 54 are located at the top of the tank 10. The first transducer means 52 produces an ultrasonic signal in the range of 1 to 5 megacycles per second, this ultrasonic signal being directed downwardly toward the upper surface of the bead anion exchange resin 22. The sound waves will strike the top of the bead resin 22, and will produce an echo which is reflected back to the second transducer means 54. The time elapsed from the production of a signal at the first transducer means 52 to the receipt of a signal at the second transducer means 54 is sensed at the control means 56, which is calibrated to close the valve 22 when this time period falls below a preselected interval, corresponding to the maximum level of the resin within the separation column 10. As with the embodiment shown in FIGS. 1 and 2, the valve 32 is kept closed for a predetermined time interval, after which it is opened, and resin is again delivered to the column until it reaches the maximum desired level. The first transducer means 52 may be "tuned" by adjusting the intensity so that fines wil not be sensed, while bead resin will.

A particular advantage of the embodiment shown in FIG. 3 is that the desired maximum level within the column 10 may be easily adjusted without the expense of repositioning the probe, as may become necessary with the embodiment shown in FIGS. 1 and 2. A second advantage is that the level of resin within the column 10 may be maintained relatively constant by providing a variable control for the valve 32. This control may be operated to increase the rate of resin delivery if the resin falls below the desired maximum level, while decreasing the rate of delivery if the resin rises above the desired level. Such precise control cannot be accomplished with the use of a probe.

Although the speed of sound (and therefore the time delay to produce an echo) will vary with temperature, the temperature is ordinarily relatively constant in a resin separation column. Should significant temperature variations be encountered, temperature sensing means (not shown) may be provided, these temperatures sensing means being connected to the control means 56 to automatically compensate for temperature variations.

Obviously, many modifications and variations of the invention as hereinbefore set forth will occur to those skilled in the art, and it is intended to cover the appended claims all such modifications and variations as fall within the true spirit and scope of the invention.

What is claimed:

1. An apparatus for separating mixed solid ion exchange resin particles having different densities by flowing liquid upwardly through said particles at a velocity sufficient to raise particles having low density into a relatively distinct layer above those having a higher density, said separating apparatus comprising mixed resin inlet means, valve means on said mixed resin inlet means, control means operatively connected to said valve means, first outlet means for said low density separated resin above said resin inlet means and second outlet means for said higher density separated resin; the improvement in means for controlling the level of resin in said apparatus comprising sonic level sensor means communicating with the interior of said apparatus above said first outlet means and including first and second transducer means, said first transducer means being adapted for generating an ultrasonic signal having a frequency in the range of 1–5 megacycles per second, and said second transducer means being adapted for receiving said ultrasonic signal, said transducer means being operatively connected to said control means to open and close said valve means responsive to the level of resin in said apparatus as determined by said ultrasonic signal.

2. The apparatus as defined in claim 1 wherein said sonic level sensor means comprise a probe positioned within said apparatus at the desired level of said resin, said probe having a gap that may be filled with said ion exchange resin granules, whereby to interrupt said signal between said first and second transducer means.

3. The apparatus as defined in claim 1 wherein said first transducer means is adapted for generating an ultrasonic signal having a frequency in the range of about 2.6 to 3.0 megacycles per second.

4. The apparatus as defined in claim 1 wherein said first and second transducer means are located at the top of said apparatus, and said first transducer means include means for emitting downwardly directed ultrasonic pulses, and said second transducer means are positioned to receive echoes of said pulses reflected from the surface of the resin, time sensing means for sensing the time delay between the delivery of a pulse at said first transducer means and receipt of an echo at said second transducer means; and wherein said control means include means for controlling said valve responsive to changes in said time delay.

5. The method of detecting the upper level of resin in an ion exchange separation column wherein upwardly flowing liquid washes fines above said upper level to produce a liquid-fine slurry, comprising, at a first location above said upper level, emitting an ultrasonic signal having a frequency in the range of 1–5 megacycles per second of sufficient intensity to penetrate said liquid-fine slurry but of insufficient intensity to penetrate said resin; receiving said signal reflected off the surface of said resin at a second location measuring the time period between said emission and said receipt of said ultrasonic signal, whereby to sense the level of resin in said column.

* * * * *